(12) United States Patent  
Lee et al.

(10) Patent No.: US 11,580,963 B2
(45) Date of Patent: Feb. 14, 2023

(54) METHOD AND APPARATUS FOR GENERATING SPEECH

(71) Applicant: Samsung Electronics Co., Ltd., Suwon-si (KR)

(72) Inventors: Jangsu Lee, Seoul (KR); Hoshik Lee, Seongnam-si (KR); Jehun Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/069,927

(22) Filed: Oct. 14, 2020

(65) Prior Publication Data

US 2021/0110817 A1 Apr. 15, 2021

(30) Foreign Application Priority Data

Oct. 15, 2019 (KR) .................. 10-2019-0127701

(51) Int. Cl.
*G10L 13/07* (2013.01)
*G10L 15/18* (2013.01)
(Continued)

(52) U.S. Cl.
CPC ........ *G10L 15/1822* (2013.01); *G10L 13/027* (2013.01); *G10L 15/02* (2013.01); *G10L 15/16* (2013.01); *G10L 2015/081* (2013.01)

(58) Field of Classification Search
CPC ....... G10L 13/07; G10L 13/08; G10L 15/063; G10L 13/06; G10L 13/047; G10L 13/027;
(Continued)

(56) References Cited

U.S. PATENT DOCUMENTS 6,366,883 B1\* 4/2002 Campbell ............. G10L 15/142
704/260
6,665,641 B1\* 12/2003 Coorman ................ G10L 13/07
704/260

(Continued)

FOREIGN PATENT DOCUMENTS

KR 10-2015-0017662 A 2/2015
KR 10-2019-0001692 A 1/2019

(Continued)

OTHER PUBLICATIONS

Goodfellow, Ian J. et al., "Generative Adversarial Nets", *Advances in neural information processing systems*. 2014 (pp. 1-9).

(Continued)

*Primary Examiner* — Jakieda R Jackson
(74) *Attorney, Agent, or Firm* — NSIP Law

(57) ABSTRACT

A speech generation method and apparatus are disclosed. The speech generation method includes obtaining, by a processor, a linguistic feature and a prosodic feature from an input text, determining, by the processor, a first candidate speech element through a cost calculation and a Viterbi search based on the linguistic feature and the prosodic feature, generating, at a speech element generator implemented at the processor, a second candidate speech element based on the linguistic feature or the prosodic feature and the first candidate speech element, and outputting, by the processor, an output speech by concatenating the second candidate speech element and a speech sequence determined through the Viterbi search.

20 Claims, 9 Drawing Sheets

(51) Int. Cl.
 *G10L 15/16* (2006.01)
 *G10L 13/027* (2013.01)
 *G10L 15/02* (2006.01)
 *G10L 15/08* (2006.01)

(58) Field of Classification Search
 CPC ......... G10L 13/10; G10L 15/02; G10L 13/00; G06N 3/0454; G06N 3/08; G06N 200/00; G06N 3/02
 See application file for complete search history.

(56) References Cited

U.S. PATENT DOCUMENTS

| | | | |
|---|---|---|---|
| 7,742,919 B1 | 6/2010 | Davis et al. | |
| 10,249,289 B2 | 4/2019 | Chun et al. | |
| 10,991,074 B2* | 4/2021 | Bousmalis | G06K 9/6259 |
| 2002/0099547 A1* | 7/2002 | Chu | G10L 13/07 704/260 |
| 2004/0111266 A1* | 6/2004 | Coorman | G10L 13/07 704/260 |
| 2005/0119890 A1* | 6/2005 | Hirose | G10L 13/08 704/E13.011 |
| 2006/0136213 A1* | 6/2006 | Hirose | G10L 13/033 704/260 |
| 2006/0224391 A1* | 10/2006 | Tamura | G10L 13/07 704/E13.01 |
| 2007/0011009 A1 | 1/2007 | Nurminen et al. | |
| 2008/0243511 A1* | 10/2008 | Fujita | G10L 13/047 704/260 |
| 2009/0048844 A1* | 2/2009 | Morinaka | G10L 13/07 704/267 |
| 2009/0144053 A1* | 6/2009 | Tamura | G10L 13/06 704/E13.007 |
| 2011/0196680 A1* | 8/2011 | Kato | G10L 13/027 704/E13.001 |
| 2015/0149178 A1* | 5/2015 | Kim | G10L 13/10 704/260 |
| 2016/0093289 A1* | 3/2016 | Pollet | G10L 13/027 704/260 |
| 2017/0092259 A1* | 3/2017 | Jeon | G10L 13/047 |
| 2017/0345411 A1* | 11/2017 | Raitio | G10L 13/0335 |
| 2018/0174052 A1* | 6/2018 | Rippel | G06K 9/66 |
| 2018/0268807 A1* | 9/2018 | Agiomyrgiannakis | G10L 13/047 |
| 2018/0342258 A1* | 11/2018 | Huffman | G10L 15/02 |
| 2019/0130212 A1* | 5/2019 | Cheng | G06K 9/4628 |
| 2019/0130278 A1* | 5/2019 | Karras | G06N 3/082 |
| 2019/0147320 A1* | 5/2019 | Mattyus | G06K 9/627 382/155 |
| 2019/0206386 A1 | 7/2019 | Kirichenko et al. | |
| 2019/0355103 A1* | 11/2019 | Baek | G06T 5/005 |
| 2020/0097554 A1* | 3/2020 | Rezagholizadeh | G06N 3/0472 |
| 2020/0134415 A1* | 4/2020 | Haidar | G06N 3/0472 |
| 2020/0151938 A1* | 5/2020 | Shechtman | G06N 3/08 |
| 2020/0175654 A1* | 6/2020 | Tagra | G06T 5/50 |

FOREIGN PATENT DOCUMENTS

| | | |
|---|---|---|
| KR | 10-2019-0016889 A | 2/2019 |
| KR | 10-2019-0046305 A | 5/2019 |
| KR | 10-2019-0085879 A | 7/2019 |
| KR | 10-2019-0085882 A | 7/2019 |
| WO | WO 2019/039873 A1 | 2/2019 |

OTHER PUBLICATIONS

Hsu, Chin-Cheng, et al., "Voice Conversion from Unaligned Corpora using Variational Autoencoding Wasserstein Generative Adversarial Networks", arXiv preprint arXiv:1704.00849, Jun. 8, 2017, (pp. 1-5).

Team, Siri. "Deep Learning for Siri's Voice: On-device Deep Mixture Density Networks for Hybrid Unit Selection Synthesis", *Apple Machine Learning J 1.4*, Aug. 2017 (pp. 1-10).

Capes, Tim et al., "Siri On-Device Deep Learning-Guided Unit Selection Text-to-Speech System", INTERSPEECH 2017, Stockholm, Sweden, Aug. 20-24, 2017 (pp. 4011-4015).

Dolhansky, Brian et al., "Eye In-painting with Exemplar Generative Adversarial Networks", *2018 IEEE/CVF Conference on Computer Vision and Pattern Recognition*, 2018 (pp. 1-10).

Trueba, Jaime Lorenz et al., "Can we steal your vocal identity from the Internet?: Initial investigation of cloning Obama's voice using GAN, WaveNet and low-quality found data", arXiv preprint arXiv:1803.00860, Mar. 2, 2018 (pp. 1-8).

Zhao, Yi et al., "Wasserstein GAN and Waveform Loss-Based Acoustic Model Training for Multi-Speaker Text-to-Speech Synthesis Systems Using a WaveNet Vocoder", IEEE Access, vol. 6, Jul. 31, 2018 (pp. 1-10).

Yeh, Cheng-chieh et al., "Rhythm-Flexible Voice Conversion Without Parallel Data Using Cycle-GAN Over Phoneme Posteriorgram Sequences", *2018 IEEE Spoken Language Technology Workshop (SLT)*, Aug. 9, 2018 (pp. 1-8).

Chandna, Pritish et al., "WGANSing: A Multi-Voice Singing Voice Synthesizer Based on the Wasserstein-GAN" *2019 27th European Signal Processing Conference (EUSIPCO)*, Jun. 19, 2019 (pp. 1-5).

* cited by examiner

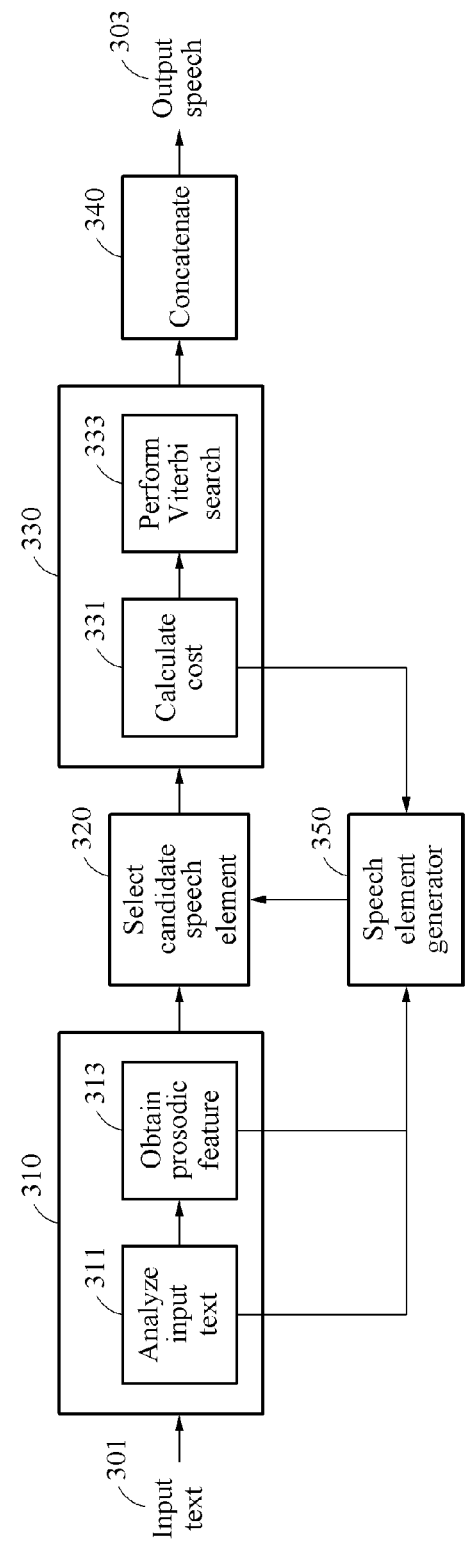

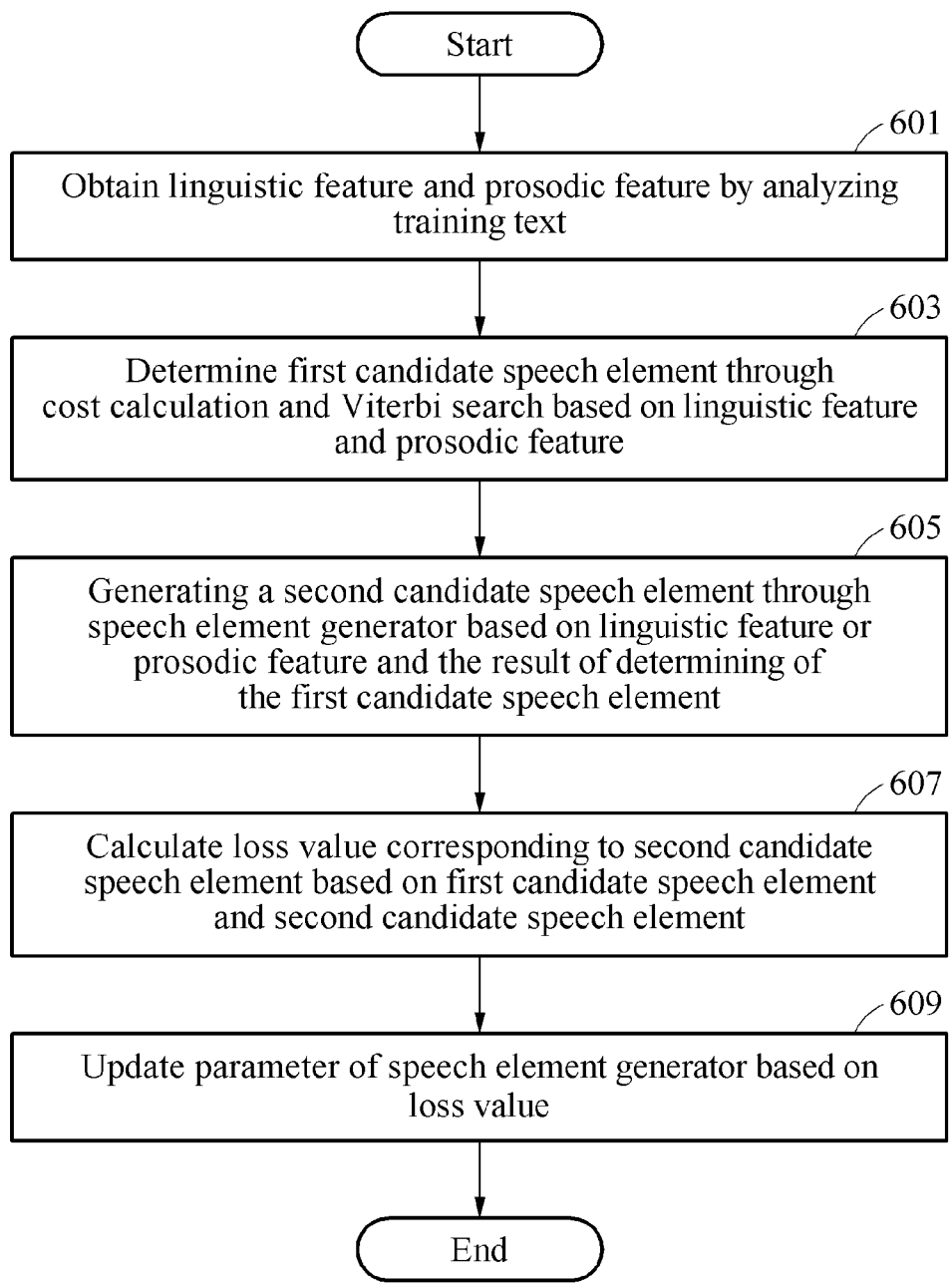

METHOD AND APPARATUS FOR GENERATING SPEECH

This application claims the benefit under 35 USC § 119(a) of Korean Patent Application No. 10-2019-0127701 filed on Oct. 15, 2019, in the Korean Intellectual Property Office, the entire disclosures of which are incorporated herein by reference for all purposes.

BACKGROUND

1. Field

The following description relates to speech synthesis that generates a speech element from an input text and outputs a natural speech.

2. Description of Related Art

Speech synthesis is a technology that automatically generates a sound wave of a speech. Speech synthesis artificially generates a speech by recording a human speech that is selected as a model, dividing the recorded speech into speech elements, adding a code and inputs the speech to which the code is added to a synthesizer, and recombining only a needed speech element as per instruction. The speech synthesis is also referred to as text-to-speech (US) synthesis.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a speech generation method including obtaining, by a processor, a linguistic feature and a prosodic feature from an input text, determining, by the processor, a first candidate speech element through a cost calculation and a Viterbi search based on the linguistic feature and the prosodic feature, generating, at a speech element generator implemented at the processor, a second candidate speech element based on the linguistic feature or the prosodic feature and the first candidate speech element, and outputting, by the processor, an output speech by concatenating the second candidate speech element and a speech sequence determined through the Viterbi search.

The generating of the second candidate speech element may include extracting, through the speech element generator, a style feature from a third candidate speech element having a smallest cost from among candidate speech elements, extracting, through the speech element generator, a content feature from a fourth candidate speech element that is different from the second candidate speech element from among the candidate speech elements, and generating, through the speech element generator, the second candidate speech element based on the linguistic feature, the style feature, and the content feature.

The generating of the second candidate speech element may include generating, through the speech element generator, the second candidate speech element based on the linguistic feature and the prosodic feature, wherein the speech element generator may include a generative adversarial network (GAN).

The speech generation method may include generating, through the speech element generator, candidate speech elements and storing the generated candidate speech elements in a memory, in response to a cost of a candidate speech element in a first candidate speech sequence being greater than a threshold.

The generating of the second candidate speech element may include generating, through the speech element generator, the second candidate speech element for each phonetic transcription unit corresponding to the input text.

The generating of the second candidate speech element may include generating the second candidate speech element through the speech element generator, in response to a cost of the first candidate speech element being greater than a threshold.

The cost may be based on a weighted average of a sum of respective costs of a speech element for each of phonetic transcription units in the input text and a sum of costs associated with concatenations of the speech elements.

The outputting of the output speech may include outputting the output speech in response to the cost meeting a threshold.

In another general aspect, there is provided a method of training a speech element generator, including obtaining, by a processor, a linguistic feature and a prosodic feature from a training text, determining, by the processor, a first candidate speech element through a cost calculation using a cost function and a Viterbi search based on the linguistic feature and the prosodic feature, generating, at a speech element generator implemented at the processor, a second candidate speech element based on the linguistic feature or the prosodic feature and the first candidate speech element, calculating, by the processor, a loss value corresponding to the second candidate speech element based on the first candidate speech element and the second candidate speech element, and updating, by the processor, a parameter of the speech element generator based on the loss value.

The calculating of the loss value may include calculating the loss value using the cost function, in response to the cost function being differentiable.

The updating of the parameter of the speech element generator may include updating a parameter of a style extractor configured to extract a style feature from the second candidate speech element having a smallest cost from among candidate speech elements, and updating a parameter of a content extractor configured to extract a content feature from a third candidate speech element different from the second candidate speech element from among the candidate speech elements.

The updating of the parameter of the speech element generator may include updating parameters of a generator and a discriminator in the speech element generator.

In another general aspect, there is provided a speech generation apparatus including a memory configured to store a speech element generator and to store instructions to be executed by the processor, and a processor configured to execute the instructions to extract a linguistic feature from an input text and to generate a prosodic feature from the input text, determine a first candidate speech element through a cost calculation and a Viterbi search based on the linguistic feature and the prosodic feature, generate a second candidate speech element through the speech element generator based on the linguistic feature or the prosodic feature and the first candidate speech element, and output an output speech by concatenating the second candidate speech element and a speech sequence determined through the Viterbi search.

The processor may be configured to extract, through the speech element generator, a style feature from a third candidate speech element having a smallest cost from among candidate speech elements, extract, through the speech element generator, a content feature from a fourth candidate speech element that is different from the second candidate speech element from among the candidate speech elements, and generate, through the speech element generator, the second candidate speech element based on the linguistic feature, the style feature, and the content feature.

The processor may be configured to generate, through the speech element generator, the second candidate speech element based on the linguistic feature and the prosodic feature, wherein the speech element generator may include a generative adversarial network (GAN).

The processor may be configured to generate, through the speech element generator, candidate speech elements and to store the generated candidate speech elements in the memory, in response to a cost of a candidate speech element in a first candidate speech sequence being greater than a threshold value.

The processor may be configured to generate, through the speech element generator, the second candidate speech element for each phonetic transcription unit corresponding to the input text.

The processor may be configured to generate the second candidate speech element through the speech element generator, in response to a cost of the first candidate speech element being greater than a threshold.

The memory may be configured to store speech elements corresponding to linguistic features and prosodic features, and the first candidate speech element is selected from the speech elements.

Other features and aspects will be apparent from the following detailed description, the drawings, and the claims.

BRIEF DESCRIPTION OF THE DRAWINGS

FIG. 5 is a diagram illustrating an example of a speech generation method.

FIG. 6 is a diagram illustrating an example of a method of training a speech element generator.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
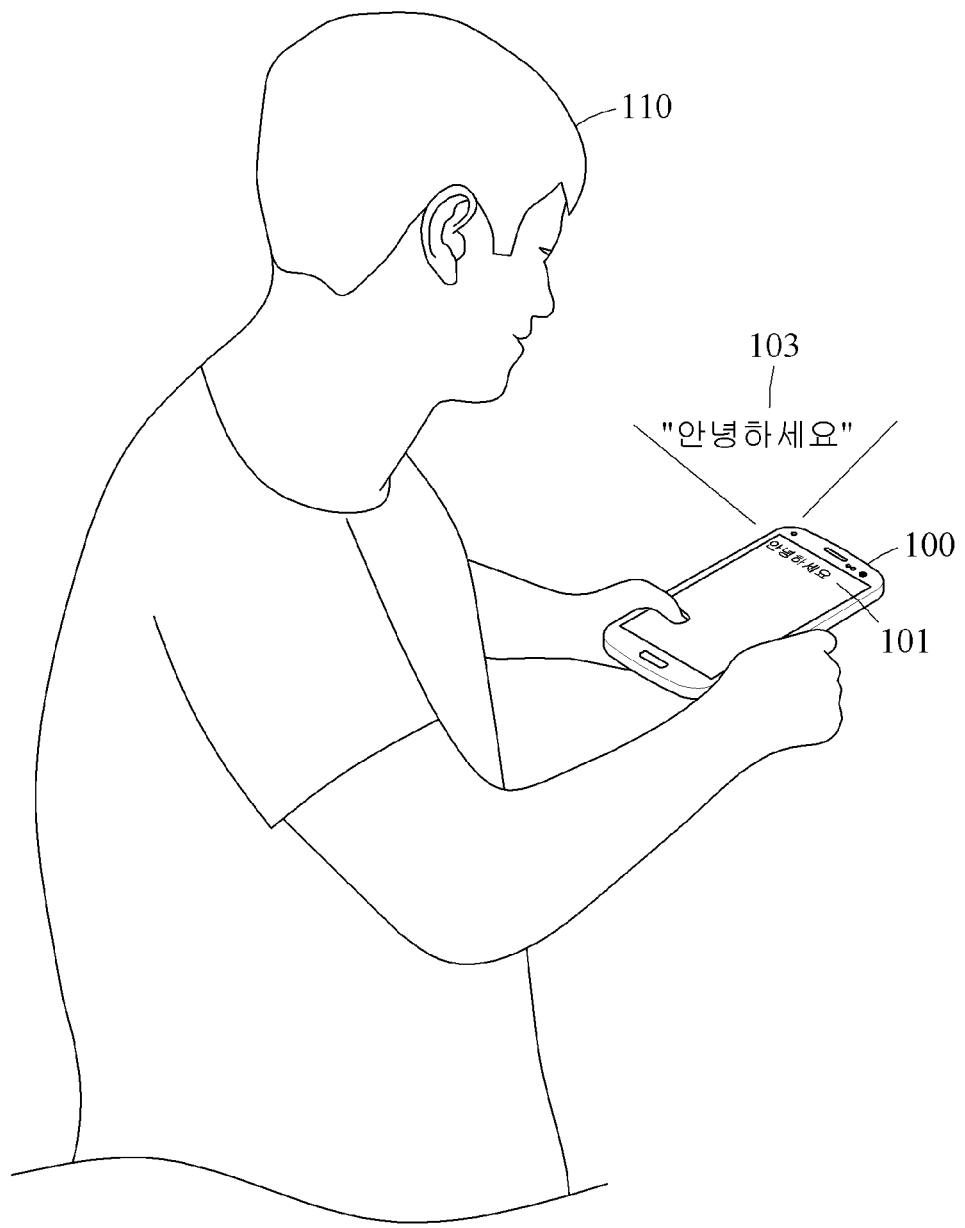
FIG. 1 is a diagram illustrating an example of how an output speech is generated from an input text by a speech generation apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram illustrating an example of an output speech being generated from an input text by a speech generation apparatus.

In an example, a speech generation apparatus 100 may receive an input text and output an output speech corresponding to the received input text. The speech generation apparatus 100 may generate a new speech element for an input text that the speech generation apparatus 100 has not been learned or has been trained with. In an example, the speech generation apparatus 100 may concatenate or combine the generated new speech element with other speech elements. Thus, even when training data that has not been used in a training phase is input, the speech generation apparatus 100 may generate an optimal speech element and output a natural speech.

The speech generation apparatus 100 may be implemented as devices that implement speech synthesis, such as, for example, a smartphone, a laptop computer, a tablet personal computer (PC), a PC, a mobile internet device (MID), a personal digital assistant (PDA), an enterprise digital assistant (EDA), a digital camera, a portable multimedia player (PMP), a personal navigation device or portable navigation device (PND), a handheld game console, an e-book, a smart device, a digital television (DTV), an artificial intelligence (AI) speaker, a home appliance such as a television, a smart television, a refrigerator, a smart home device, a vehicle such as a smart vehicle, an Internet of Things (IoT) device, a wearable electronic device, such as smart watch, a smart band, or smart glasses, an electric vehicle, an electronic device, a robot, or any other device that performs speech synthesis as an interface. The speech generation apparatus 100 may include a chipset semiconductor.

In addition to speech synthesis, a features described herein for the speech generation apparatus 100 may also be applied to other cases where different or discrete sources other than a speech, for example, an image and music, may be sequentially connected to generate a single result. For example, the features of the speech generation apparatus 100 may generate a frame corresponding to a damaged portion of an image based on a previous frame and a subsequent frame of the damaged portion and naturally connect the generated frame to an entirety of frames.

In an example, the speech generation apparatus 100 includes a speech element generator for speech synthesis. The speech element generator may include an artificial neural network, which refers to a model that has an ability to solve a problem, the model including artificial neurons (nodes) that forms a network through synaptic combinations and changes a connection strength of the synapses through training. In the neural network, each neuron may multiply an input value by a weight and add a bias, and then apply an activation function to obtain an output value. The activation function may determine a form of a value that passes through such artificial neural network.

The neural network may include a plurality of layers. The plurality of layers may include an input layer, at least one hidden layer, and an output layer. In an example, neural network may include a sub-sampling layer, a pooling layer, a fully connected layer, etc., in addition to a convolution layer. The neural network may map input data and output data that have a nonlinear relationship based on deep learning to perform tasks such as, for example, object classification, object recognition, audio or speech recognition, and image recognition.

The neural network may be trained to perform a desired operation by mapping input data and output data that have a nonlinear relationship therebetween through deep learning to perform various tasks. The deep learning is a machine learning method used to solve a problem given from a big dataset. The deep learning may also be construed as a problem-solving process for optimization to find a point where energy is minimized while training the neural network using provided training data. Through deep learning, for example, supervised or unsupervised learning, a weight corresponding to an architecture or a model of the neural network may be obtained, and the input data and the output data may be mapped to each other based on the obtained weight. In an example, a parameter of each of the nodes of the neural network may be adjusted while an error of a result output by the output layer is propagated backward along the neural network. This is referred to as backpropagation.

In an example, the neural network may correspond to a recurrent neural network (RNN) or a convolutional neural network (CNN). In an example, the CNN may be a deep neural network (DNN). In an example, the DNN may include a region proposal network (RPN), a classification network, a reinforcement learning network, a fully-connected network (FCN), a deep convolutional network (DCN), a long-short term memory (LSTM) network, a grated recurrent units (GRUs), and a generative adversarial network (GAN).

In an example, the neural network may be implemented as an architecture having a plurality of layers including an input image, feature maps, and an output. In the neural network, a convolution operation between the input source sentence, (e.g., voice entry) and a filter referred to as a kernel, is performed, and as a result of the convolution operation, the feature maps are output. Here, the feature maps that are output may be input feature maps for a subsequent layer, and a convolution operation between the output feature maps and the kernel is performed again, and as a result, new feature maps are output. Based on such repeatedly performed convolution operations, a recognition result with respect to features of the input source sentence may be finally output through the neural network.

In another example, the neural network may receive an input image instead of an input source sentence, (e.g., voice entry). In such an example, a convolution operation is performed between the input image, and a filter referred to as a kernel, and as a result of the convolution operation, the feature maps are output. Here, the feature maps that are output may be input feature maps for a subsequent layer, and a convolution operation between the output feature maps and the kernel is performed again, and as a result, new feature maps are output. Based on such repeatedly performed convolution operations, results of recognition of characteristics of the input image via the neural network may be output.

In an example, the speech generation apparatus 100 may generate the output speech through a text-to-speech (TTS) method of concatenating a plurality of speech elements. The speech generation apparatus 100 may extract a linguistic feature of the input text and generate a prosodic feature of the input text. In an example, the prosodic feature of the input text, such as rhythm, stress, pitch, and intonation of speech, provides information beyond a sentence's literal word meaning. In a database (DB), a plurality of speech elements corresponding to various linguistic features and prosodic features may be stored in advance. The speech generation apparatus 100 may select, from the DB, a speech element corresponding to the extracted linguistic feature and the generated prosodic feature. The speech generation apparatus 100 may select a suitable speech element that most closely corresponds to the linguistic feature and the prosodic feature.

When the input text is provided as a text corresponding to a plurality of phonetic transcription units, the speech generation apparatus 100 may select a speech element for each of the phonetic transcription units. When selecting a speech element, in an example, the speech generation apparatus 100 may calculate a cost of each speech element and perform a Viterbi search. The speech generation apparatus 100 may calculate a differential value or a gradient of the cost of each speech element, and select a speech element based on a result of the calculation. The speech generation apparatus 100 may generate the output speech by concatenating a plurality of speech elements selected through such cost calculation and Viterbi search. Thus, the speech elements may be naturally concatenated or combined with one another in the output speech. In an example, the phonetic transcription unit described herein refers to a segmental unit of a phonetic transcription.

$$C = w_t \sum_{n=1}^{N} T(u_n) + w_c \sum_{n=1}^{N} C(u_n, u_{n-1}) \quad \text{[Equation 1]}$$

The speech generation apparatus 100 may calculate a cost of a speech element using Equation 1 above. In Equation 1, a first term indicates a sum of respective costs of n speech elements, and a second term indicates a sum of costs associated with concatenations of the speech elements. The speech generation apparatus 100 may calculate C based on a weighted average of the first term and the second term.

The DB may not include all types of speech elements, and thus, a speech element that is suitable for a linguistic feature extracted from a given input text or a corresponding prosodic feature may not be retrieved from the DB. However, the speech generation apparatus 100 may generate the speech element that is suitable for the linguistic feature and the prosodic feature. For example, the speech generation apparatus 100 may generate a new speech element by extracting a style feature and a content feature from a speech element having a smallest cost, and synthesizing the extracted style feature and content feature. In another example, the speech generation apparatus 100 may generate a speech element using a generative adversarial network (GAN). However, a method of generating a speech element is not limited to the examples described in the foregoing, and various methods may be used to generate a speech element without departing from the spirit and scope of the illustrative examples described.

When a speech element having a similar feature to the prosodic feature is not present in the DB, the speech generation apparatus 100 may extract a style feature from a speech element having a minimum cost. The speech generation apparatus 100 may extract a content feature based on the linguistic feature and a result of the Viterbi search. In an example, the speech generation apparatus 100 may extract the content feature using a speech element in addition to the speech element having the minimum cost. The speech generation apparatus 100 may synthesize the style feature and the content feature and generate a new speech element. The speech generation apparatus 100 may set the generated new speech element to be a candidate speech element in a corresponding phonetic transcription unit, and obtain a speech sequence through the Viterbi search. In an example, the style feature may include the prosodic feature, and the content feature may include the linguistic feature.

In an example, the GAN may comprise two neural networks that are competitively trained with training data. The two neural networks used in a training phase may be referred to as a generator and a discriminator, respectively. Such appellations may be given for identification, and thus be changed to other appellations so long as they perform the same functions. The generator may generate data that looks or sounds almost genuine from the given training data, and the discriminator may determine whether the data generated by the generator is genuine or fake. Based on a result of the determining, a parameter of the generator and a parameter of the discriminator may be updated through backpropagation such that a function of the generator and a function of the discriminator are improved further.

Referring to FIG. 1, the speech generation apparatus 100 receives an input text 101 "안녕하세요" from a user 110, when the user uses the Korean language. The speech generation apparatus 100 analyzes the input text 101 "안녕하세요" and extracts a linguistic feature "ㅇㅏㄴㄴㅕㅇ . . . " from the input text 101. The speech generation apparatus 100 extracts a prosodic feature corresponding to the linguistic feature. The prosodic feature may include an acoustic feature. For example, the prosodic feature may include pitch, power, duration, and intonation. The speech generation apparatus 100 selects, from the DB, a plurality of candidate speech elements having similar features to the two extracted features. For example, the speech generation apparatus 100 may select the candidate speech elements for each phonetic transcription unit corresponding to the input text 101. The candidate speech elements may become a subject for a Viterbi search.

When a candidate speech element does not satisfy a preset condition, the speech generation apparatus 100 generates a new speech element. The speech generation apparatus 100 calculates a cost of a candidate speech element selected for each phonetic transcription unit. In an example, when the calculated cost is greater than a threshold value, the speech generation apparatus 100 generates a new speech element for a corresponding phonetic transcription unit. For example, when a cost of a speech element selected for a vowel "ㅓ" is greater than the threshold value, the speech generation apparatus 100 may generate a new speech element corresponding to the vowel "ㅓ."

As described above, the speech generation apparatus 100 may select or generate a plurality of candidate speech elements that satisfy a condition related to a cost for each phonetic transcription unit. The speech generation apparatus 100 may then perform a Viterbi search on the candidate speech elements for all phonetic transcription units, and obtain an optimal speech sequence. In the example of FIG. 1, the speech generation apparatus 100 naturally concatenates or combines the speech sequence and outputs an output speech 103 "안녕하세요" through a speaker.

Figure 2:
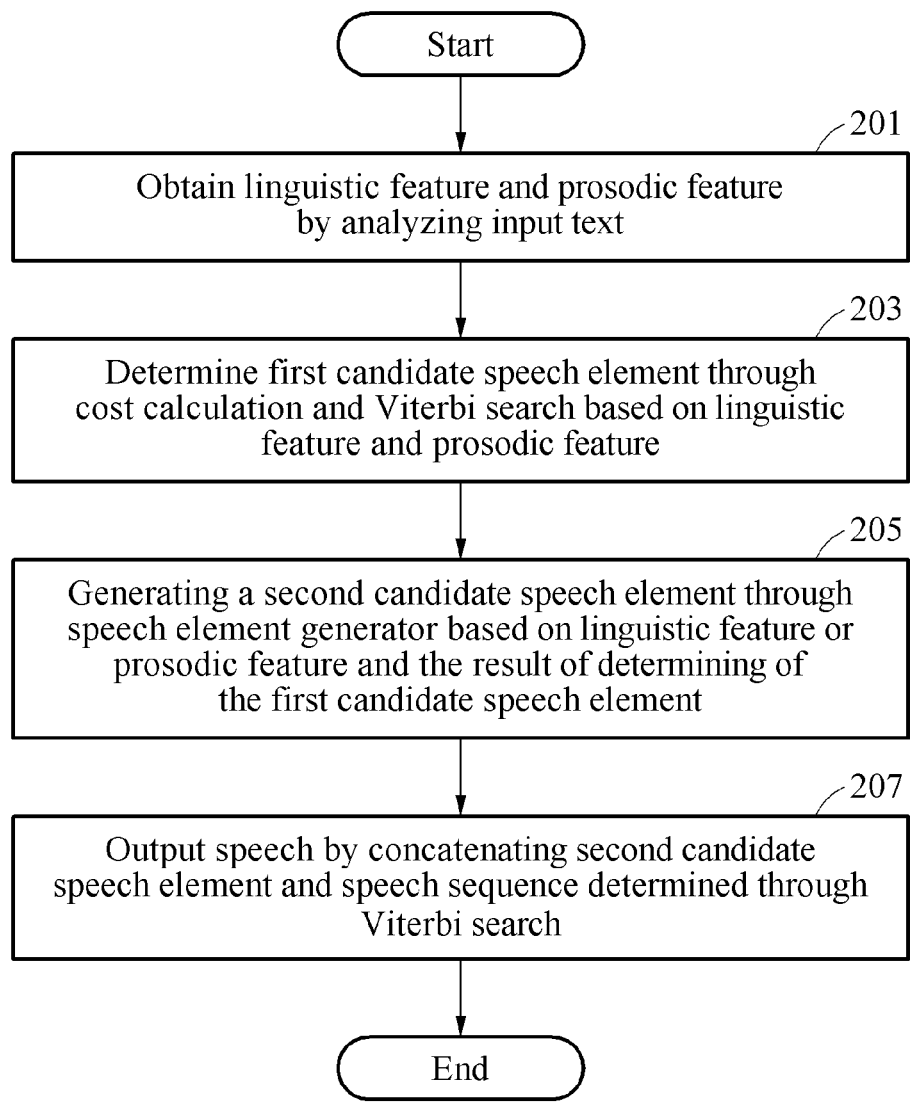
FIG. 2 is a diagram illustrating an example of a speech generation method.

FIG. 2 is a diagram illustrating an example of a speech generation method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 is also applicable to FIG. 2, and are incorporated herein by reference. Thus, the above description may not be repeated here.

Referring to FIG. 2, in operation 201, the speech generation apparatus 100 obtains a linguistic feature and a prosodic feature by analyzing an input text.

In operation 203, the speech generation apparatus 100 determines a first candidate speech element through a cost calculation and a Viterbi search based on the linguistic feature and the prosodic feature. In an example, a plurality of speech elements corresponding to various linguistic features and prosodic features may be stored in advance in a DB. When selecting a speech element, the speech generation apparatus 100 calculates a cost of each speech element and performs the Viterbi search.

In operation 205, the speech generation apparatus 100 generates a second candidate speech element through a speech element generator based on the linguistic or the prosodic feature and a result of the determining of the first candidate speech element. For example, the speech generation apparatus 100 may generate a new speech element by extracting a style feature and a content feature from a speech element having a smallest cost and synthesizing the extracted style feature and the content feature. For another example, the speech generation apparatus 100 may generate a speech element using a GAN.

In operation 207, the speech generation apparatus 100 outputs an output speech by concatenating the second candidate speech element and a speech sequence determined through the Viterbi search. The speech generation apparatus 100 naturally concatenates the second candidate speech element and the speech sequence and outputs the final output speech through a speaker, for example.

In an example, when a cost of a candidate speech element included in a first candidate speech sequence is greater than a threshold value, the speech generation apparatus 100 may generate a plurality of candidate speech elements through the speech element generator and store the generated candidate speech elements in a memory. For example, the speech generation apparatus 100 may generate a new speech element using various phonetic transcriptions that are unseen in a training phase, and store the generated new speech element in the DB. In this example, in an inference phase, generating a new speech element may be reduced, and thus the speech generation apparatus 100 may output the output speech more rapidly.

In another example, the speech generation apparatus 100 may generate the second candidate speech element through the speech element generator for each phonetic transcription unit corresponding to the input text. For example, the speech generation apparatus 100 may generate a new speech element each time for each phonetic transcription unit and add the generated new speech element to a group of candidate speech elements, and discover an optimal speech sequence through the Viterbi search.

In another example, when a cost of the first candidate speech element is greater than the threshold value, the speech generation apparatus 100 may generate the second candidate speech element through the speech element generator. For example, only when a cost of a candidate speech element retrieved from the DB does not satisfy a preset condition, the speech generation apparatus 100 may generate a new speech element.

Figure 3:
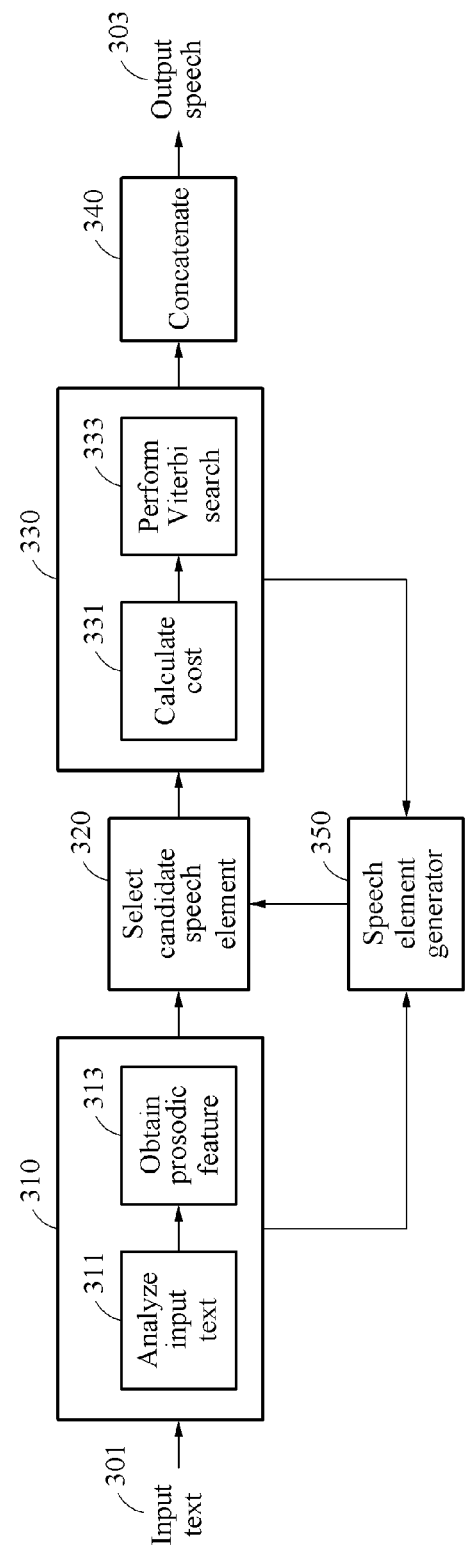
FIG. 3 is a diagram illustrating an example of a speech generation method.

FIG. 3 is a diagram illustrating an example of a speech generation method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, the speech generation apparatus 100 receives an input text 301. The input text 301 may include a plurality of phonetic transcription units. For example, a phonetic transcription that is obtained by converting the input text 301 to a speech may have a plurality of segmental units, for example, the phonetic transcription units.

In operation 310, the speech generation apparatus 100 extracts a feature of the input text 301. In operation 311, the speech generation apparatus 100 extracts a linguistic feature, from the input text 301. In operation 313, the speech generation apparatus 100 extracts or generates a prosodic feature based on the linguistic feature.

In operation 320, the speech generation apparatus 100 selects a candidate speech element. The speech generation apparatus 100 selects a candidate speech element that most closely corresponds to the extracted feature from a DB in which speech elements corresponding to various phonetic transcriptions are stored.

In operation 330, the speech generation apparatus 100 performs a Viterbi search based on the selected candidate speech element and evaluates a result of performing the Viterbi search. In operation 331, the speech generation apparatus 100 calculates a cost of the selected candidate speech element. In operation 333, the speech generation apparatus 100 performs the Viterbi search on each candidate speech element for each phonetic transcription unit to determine an optimal speech sequence. For example, the speech generation apparatus 100 may determine the optimal speech sequence through a cost calculation. In this example, the speech generation apparatus 100 may calculate a total cost by combining a cost of each speech element for each phonetic transcription unit and a cost between speech elements. The speech generation apparatus 100 may determine, to be the speech sequence, a combination with a smallest total cost.

In operation 340, when a cost of the speech sequence satisfies a preset condition, the speech generation apparatus 100 concatenates each of speech elements of the speech sequence to output a natural output speech 303. In operation 350, when the cost of the speech sequence does not satisfy the condition, the speech generation apparatus 100 generates a new speech element through a speech element generator. In an example, the speech generation apparatus 100 performs the Viterbi search on a new candidate group including the new speech element and determines a speech sequence having a smaller cost.

Figure 4A:
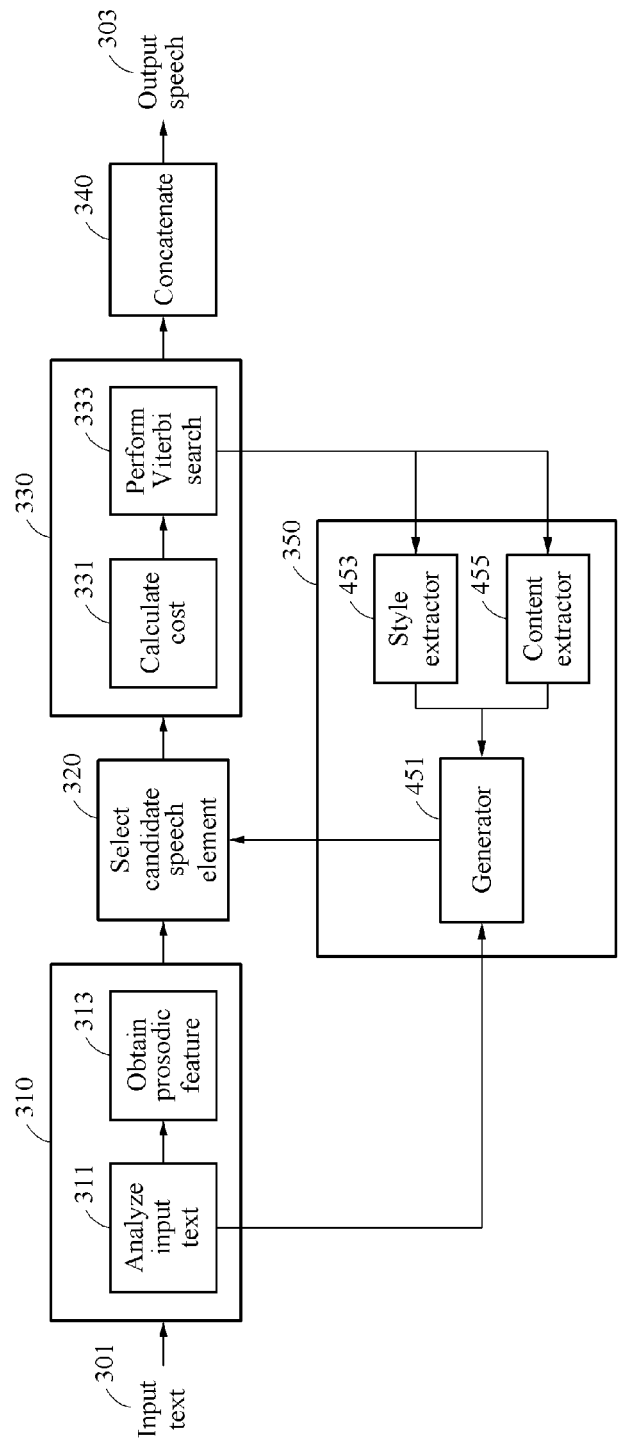
FIGS. 4A through 4C are diagrams illustrating examples of a speech generation method.
Figure 4B:
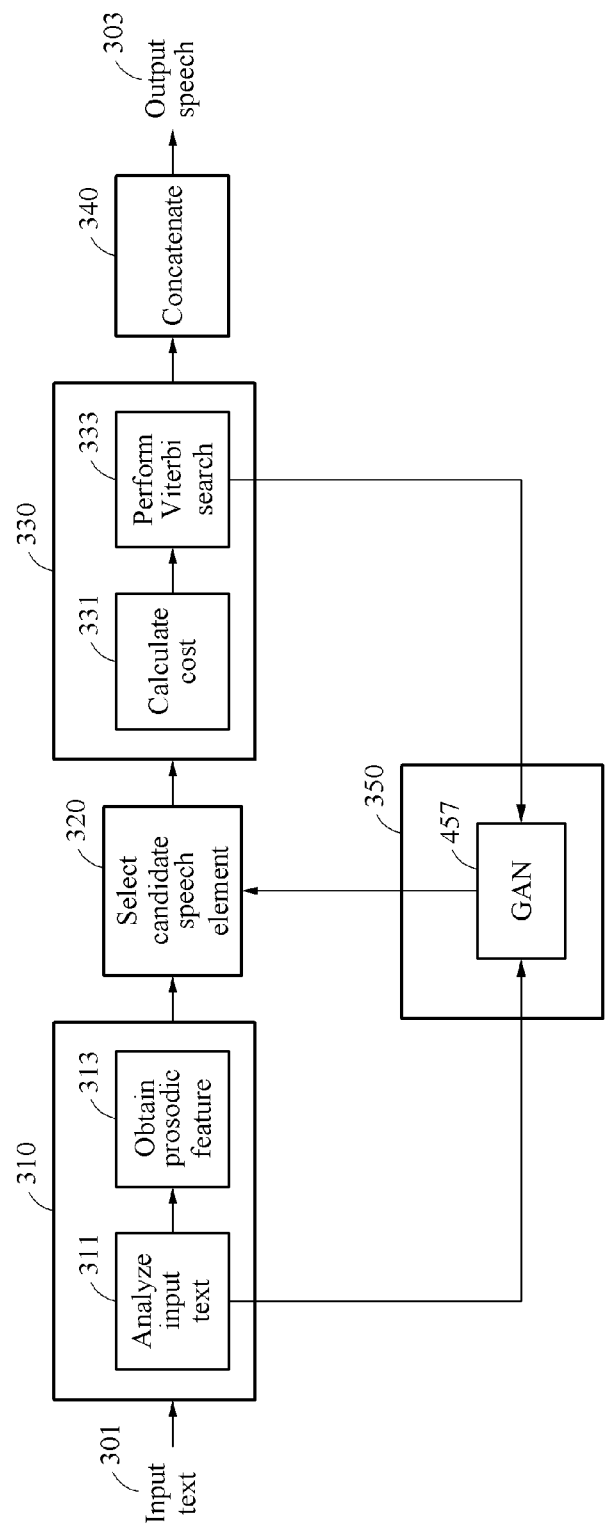
Figure 4C:
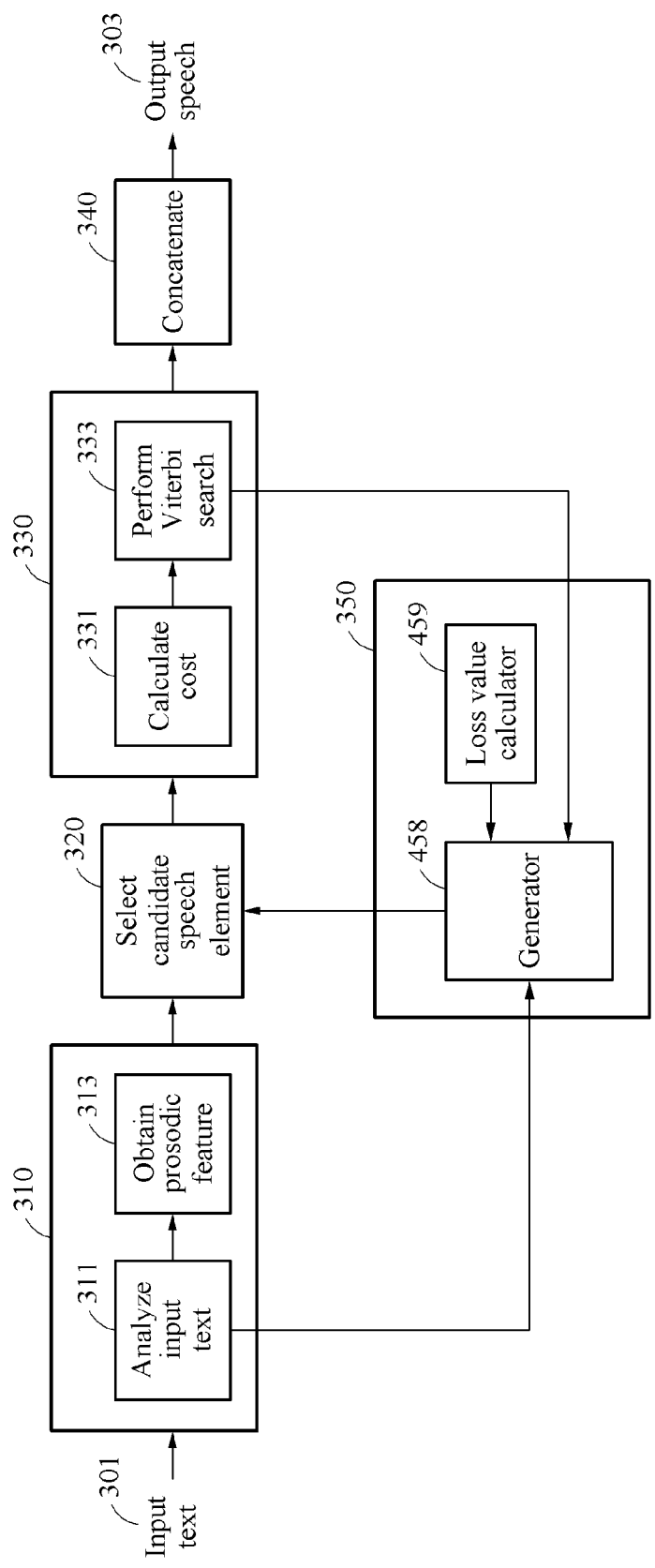

FIG. 4A is a diagram illustrating an example of a speech generation method. FIG. 4B is a diagram illustrating another example of a speech generation method. FIG. 4C is a diagram illustrating another example of a speech generation method. The operations in FIGS. 4A-4C may be performed in the sequence and manner as shown, although the order of some operations may be changed or some of the operations omitted without departing from the spirit and scope of the illustrative examples described. Many of the operations shown in FIGS. 4A-4C may be performed in parallel or concurrently. One or more blocks of FIGS. 4A-4C, and combinations of the blocks, can be implemented by special purpose hardware-based computer, such as a processor, that perform the specified functions, or combinations of special purpose hardware and computer instructions. In addition to the description of FIGS. 4A-4C below, the descriptions of FIGS. 1-3 are also applicable to FIGS. 4A-4C, and are incorporated herein by reference. Thus, the above description may not be repeated here.

The speech generation apparatus 100 may generate a second candidate speech element through a speech element generator based on a linguistic or prosodic feature and a result of determining a first candidate speech element. In operation 350, when a cost of a speech sequence does not satisfy a preset condition, the speech generation apparatus 100 generates a new speech element through the speech element generator. In an example, the speech generation apparatus 100 performs a Viterbi search on a new candidate group including the new speech element and determines a speech sequence having a smaller cost.

Referring to FIG. 4A, in operation 453, a style extractor extracts a style feature from a third candidate speech element having a smallest cost from among a plurality of candidate speech elements. In operation 455, a content extractor extracts a content feature from a fourth candidate speech element that is different from the second candidate speech element from among the candidate speech elements. In operation 451, a generator generates the second candidate speech element based on the linguistic feature, the style feature, and the content feature.

Referring to FIG. 4B, in operation 457, a GAN generates a second candidate speech element based on a third candidate speech element having a smallest cost from among a plurality of candidate speech elements and a linguistic feature which is a result of analyzing an input text.

Referring to FIG. 4C, in operation 458, a generator generates a second candidate speech element based on a cost of each of a plurality of candidate speech elements using a result of a Viterbi search and a result of analyzing an input text. In operation 459, a loss value calculator calculates the cost of each of the candidate speech elements using a loss function. The loss value calculator may calculate a gradient of each of the candidate speech elements, and determine a candidate speech element having a minimum cost.

FIG. 5 is a diagram illustrating an example of a speech generation method. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4C are also applicable to FIG. 5, and are incorporated herein by reference. Thus, the above description may not be repeated here.

Referring to FIG. 5, the speech generation apparatus 100 may generate a second candidate speech element through a speech element generator based on a linguistic or prosodic feature and a result of determining a first candidate speech element. In operation 350, when a cost of a speech sequence does not satisfy a preset condition, the speech generation apparatus 100 generates a new speech element through the speech element generator.

The speech generation apparatus 100 may generate the second candidate speech element based on the linguistic feature and the prosodic feature. The speech element generator may include a GAN. The speech element generator may include a neural network that is trained through a competitive training phase for a generator and a discriminator.

FIG. 6 is a diagram illustrating an example of a method of training a speech element generator. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In an example, the method of training a speech element generator may hereinafter be referred to as a training method. The training method may be performed by an apparatus for training the speech element generator, which may hereinafter be referred to as a training apparatus. In addition to the description of FIG. 6 below, the descriptions of FIGS. 1-5 are also applicable to FIG. 6, and are incorporated herein by reference. Thus, the above description may not be repeated here.

Referring to FIG. 6, in operation 601, the training apparatus obtains, by a processor, a linguistic feature and a prosodic feature by analyzing a training text. The training text may include pairs of various types of sentences and corresponding speeches. For example, the training text may include a pair of a sentence and a corresponding speech.

In operation 603, the training apparatus determines a first candidate speech element through a cost calculation using a cost function and a Viterbi search based on the linguistic feature and the prosodic feature.

In operation 605, the training apparatus generates, through a speech element generator, a second candidate speech element based on the linguistic or prosodic feature and a result of determining the first candidate speech element.

In operation 607, the training apparatus calculates a loss value corresponding to the second candidate speech element based on the first candidate speech element and the second candidate speech element.

In operation 609, the training apparatus updates a parameter of the speech element generator based on the loss value.

When the cost function is differentiable, the training apparatus calculates the loss value using the cost function. For example, when the cost function is differentiable, the training apparatus calculates a gradient of the cost function and adjusts the parameter of the speech element generator through backpropagation based on a result of the calculating.

In an example, the speech element generator may include a style extractor configured to extract a style feature from a speech element having a smallest cost, and a content extractor configured to extract a content feature from the speech element. In this example, the training apparatus may update the parameter of the speech element generator that includes a parameter of the style extractor configured to extract a style feature from the second candidate speech element having a smallest cost from among a plurality of candidate speech elements, and a parameter of the content extractor configured to extract a content feature from a third candidate speech element different from the second candidate speech element among the candidate speech elements.

For another example, the speech element generator may include a GAN. In this example, the training apparatus may update parameters of a generator and a discriminator which are included in the speech element generator.

The generator and the discriminator may receive the linguistic feature and the prosodic feature. The speech element generator may specify a speech element that is to be generated and discriminated using these features. The speech element generator may generate a new speech element using a knowledge learned from an existing speech element based on the received features. The generator may receive noise data along with the features and generate a new speech element. The discriminator may discriminate between a speech element selected through a cost calculation and a Viterbi search and the speech element generated by the generator. The speech element having a smallest cost that is selected through the cost calculation and the Viterbi search may be set to be genuine or real, and the generated speech element may be set to be fake. A loss value may be calculated at each step and the parameters of the generator and the discriminator may be updated. The generator may be trained to generate a most realistic or plausible speech element such that the discriminator selects the fake one, while the discriminator may be trained to select the genuine speech element. Through such competitive training phase, the generator may generate a more realistic or plausible speech element, and the trained generator may be used in an inference phase.

Figure 7:
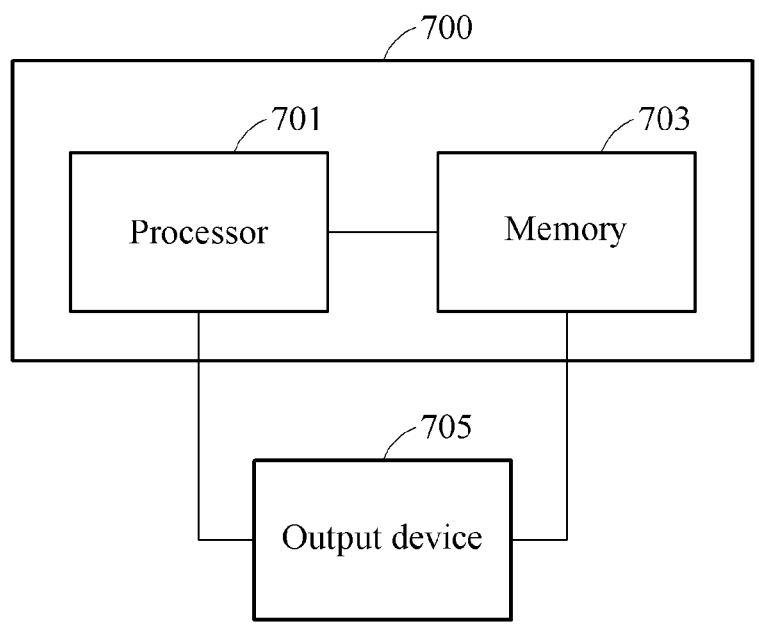
FIG. 7 is a diagram illustrating an example of a speech generation apparatus.

FIG. 7 is a diagram illustrating an example of a speech generation apparatus.

Referring to FIG. 7, a speech generation apparatus 700 includes processor 701, a memory 703, and an output device 705. The processor 701 may obtain a linguistic feature and a prosodic feature by analyzing an input text. The processor 701 may determine a first candidate speech element through a cost calculation and a Viterbi search based on the linguistic feature and the prosodic feature. The processor 701 may generate a second candidate speech element through the speech element generator based on the linguistic or prosodic feature and a result of determining the first candidate speech element. In an example, the processor 701 may output an output speech, through the output device 705, by concatenating the second candidate speech element and a speech sequence determined through the Viterbi search.

In an example, the processor 701 may extract, through the speech element generator, a style feature from a third candidate speech element having a smallest cost from among a plurality of candidate speech elements. The processor 701 may extract, through the speech element generator, a content feature from a fourth candidate speech element that is different from the second candidate speech element from among the candidate speech elements. The processor 701 may generate, through the speech element generator, the second candidate speech element based on the linguistic feature, the style feature, and the content feature.

In another example, the processor 701 may generate, through the speech element generator, the second candidate speech element based on the linguistic feature and the prosodic feature. The speech element generator may include a GAN.

For example, when a cost of a candidate speech element included in a first candidate speech sequence is greater than a threshold value, the processor 701 may generate a plurality of candidate speech elements through the speech element generator and store the generated candidate speech elements in the memory 703. In another example, the processor 701 may generate the second candidate speech element through the speech element generator for each phonetic transcription unit corresponding to the input text. In another example, when a cost of the first candidate speech element is greater than the threshold value, the processor 701 may generate the second candidate speech element through the speech element generator.

The memory 703 may store information or data needed for the processor 701 to process. For example, a plurality of speech elements corresponding to various linguistic features and prosodic features may be stored in advance in the memory 703. The memory 703 may include a non-transitory computer-readable storage medium or device, for example, a random-access memory (RAM), a dynamic RAM (DRAM), a static RAM (SRAM), a magnetic hard disk, an optical disc, a flash memory, an electrically erasable programmable read-only memory (EPROM), a floppy disk, and other types of computer-readable storage medium that are well-known in the related technical field. The memory 703 may store the instructions to be executed by the processor 701, and store related information while software or an application is being executed by the speech generation apparatus 700.

The processor 701 may output the speech to the output device 705 or may apply the speech to an application through the output device 705. The output device 705 may provide an output of the speech to a user through auditory, visual, or tactile channel. The output device 705 may include, for example, a speaker, a display, a touchscreen, a vibration generator, and other devices that may provide the user with the output. The output device 705 is not limited to the example described above, and any other output device, such as, for example, computer speaker and eye glass display (EGD) that are operatively connected to the speech generation apparatus 700 may be used without departing from the spirit and scope of the illustrative examples described. In an example, the output device 705 is a physical structure that includes one or more hardware components that provide the ability to render a user interface, output information and speech, and/or receive user input.

Figure 8:
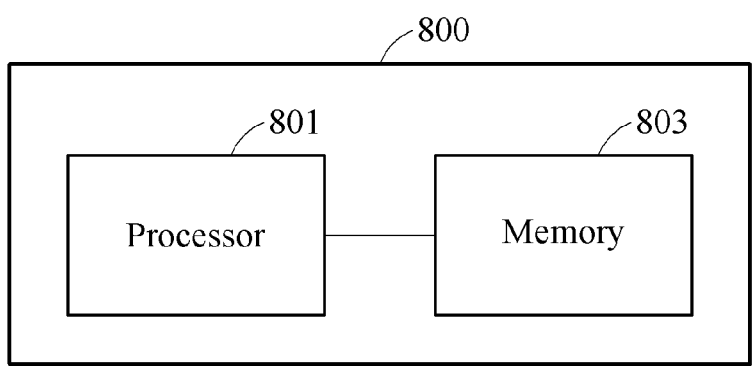
FIG. 8 is a diagram illustrating an example of an apparatus for training a speech element generator.

FIG. 8 is a diagram illustrating an example of a training apparatus.

Referring to FIG. 8, a training apparatus 800 configured to train a speech element generator includes a processor 801 and a memory 803 configured to store a plurality of speech elements corresponding to various linguistic features and prosodic features, the instructions to be executed by the processor 801, and related information while software or an application is being executed by the speech training apparatus 800. The processor 810 may obtain a linguistic feature and a prosodic feature by analyzing a training text. The processor 801 may determine a first candidate speech element through a cost calculation using a cost function and a Viterbi search based on the linguistic feature and the prosodic feature. The processor 801 may generate a second candidate speech element through the speech element generator based on the linguistic or prosodic feature and a result of determining the first candidate speech element. The processor 801 may calculate a loss value corresponding to the second candidate speech element based on the first candidate speech element and the second candidate speech element. The processor 801 may update a parameter of the speech element generator based on the loss value.

When the cost function is differentiable, the training apparatus 800 may calculate the loss value using the cost function. For example, when the cost function is differentiable, the training apparatus 800 may calculate a gradient of the cost function and adjust the parameter of the speech element generator through backpropagation based on a result of the calculating.

In an example, the processor 801 may update the parameter of the speech element generator that includes a parameter of a style extractor configured to extract a style feature from the second candidate speech element having a smallest cost among the candidate speech elements and a parameter of a feature extractor configured to extract a content feature from a third candidate speech element different from the second candidate unit among the candidate speech elements.

In another example, the processor 801 may update parameters of a generator and a discriminator that are included in the speech element generator.

The speech generation apparatus 100, speech element generator, style extractor, content extractor, generator, loss value calculator, speech generation apparatus 700, training apparatus 800, and other apparatuses, devices, units, modules, and components described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 2, 3, 4, 5, and 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the speech generation method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech generation method comprising:
    obtaining, by a processor, a linguistic feature and a prosodic feature from an input text;
    determining, by the processor, a first candidate speech element through a cost calculation and a Viterbi search based on the linguistic feature and the prosodic feature;
    in response to a calculated cost of the first candidate speech element being greater than a preset threshold, generating, at a speech element generator implemented at the processor, a second candidate speech element based on the linguistic feature or the prosodic feature and the first candidate speech element,
    the speech element generator being configured to provide the second candidate speech element being generated as an output; and
    outputting, by the processor, an output speech by concatenating the second candidate speech element and a speech sequence determined through the Viterbi search.

2. The speech generation method of claim 1, wherein the generating of the second candidate speech element comprises:
    extracting, through the speech element generator, a style feature from a third candidate speech element having a smallest cost from among candidate speech elements;
    extracting, through the speech element generator, a content feature from a fourth candidate speech element that is different from the second candidate speech element from among the candidate speech elements; and
    generating, through the speech element generator, the second candidate speech element based on the linguistic feature, the style feature, and the content feature.

3. The speech generation method of claim 1, wherein the generating of the second candidate speech element comprises:
    generating, through the speech element generator, the second candidate speech element based on the linguistic feature and the prosodic feature,
    wherein the speech element generator comprises a generative adversarial network (GAN).

4. The speech generation method of claim 1, further comprising:
    generating, through the speech element generator, candidate speech elements and storing the generated candidate speech elements in a memory, in response to a cost of a candidate speech element in a first candidate speech sequence being greater than a threshold.

5. The speech generation method of claim 1, wherein the generating of the second candidate speech element comprises:
    generating, through the speech element generator, the second candidate speech element for each phonetic transcription unit corresponding to the input text.

6. The speech generation method of claim 1, wherein the cost is based on a weighted average of a sum of respective costs of a speech element for each of phonetic transcription units in the input text and a sum of costs associated with concatenations of the speech elements.

7. The speech generation method of claim 6, wherein the outputting of the output speech comprises outputting the output speech in response to the cost meeting a threshold.

8. A non-transitory computer-readable storage medium storing instructions that, when executed by a processor, cause the processor to perform the speech generation method of claim 1.

9. A method of training a speech element generator, comprising:
    obtaining, by a processor, a linguistic feature and a prosodic feature from a training text;
    determining, by the processor, a first candidate speech element through a cost calculation using a cost function and a Viterbi search based on the linguistic feature and the prosodic feature;
    in response to a calculated cost of the first candidate speech element being greater than a preset threshold, generating, at a speech element generator implemented at the processor, a second candidate speech element based on the linguistic feature or the prosodic feature and the first candidate speech element, the speech element generator being configured to provide the second candidate speech element being generated as an output;
    calculating, by the processor, a loss value corresponding to the second candidate speech element based on the first candidate speech element and the second candidate speech element; and
    updating, by the processor, a parameter of the speech element generator based on the loss value.

10. The method of claim 9, wherein the calculating of the loss value comprises:
    calculating the loss value using the cost function, in response to the cost function being differentiable.

11. The method of claim 9, wherein the updating of the parameter of the speech element generator comprises:
    updating a parameter of a style extractor configured to extract a style feature from the second candidate speech element having a smallest cost from among candidate speech elements, and
    updating a parameter of a content extractor configured to extract a content feature from a third candidate speech element different from the second candidate speech element from among the candidate speech elements.

12. The method of claim 9, wherein the updating of the parameter of the speech element generator comprises:
    updating parameters of a generator and a discriminator in the speech element generator.

13. A non-transitory computer-readable storage medium storing instructions that, when executed by a processor, cause the processor to perform the speech generation method of claim 9.

14. A speech generation apparatus comprising:
a memory configured to store a speech element generator and to store instructions to be executed by the processor; and
a processor configured to execute the instructions to:
extract a linguistic feature from an input text and generate a prosodic feature from the input text,
determine a first candidate speech element through a cost calculation and a Viterbi search based on the linguistic feature and the prosodic feature,
in response to a calculated cost of the first candidate speech element being greater than a preset threshold, generate a second candidate speech element through the speech element generator based on the linguistic feature or the prosodic feature and the first candidate speech element, the speech element generator being configured to provide the second candidate speech element being generated as an output, and
output an output speech by concatenating the second candidate speech element and a speech sequence determined through the Viterbi search.

15. The speech generation apparatus of claim 14, wherein the processor is further configured to:
extract, through the speech element generator, a style feature from a third candidate speech element having a smallest cost from among candidate speech elements;
extract, through the speech element generator, a content feature from a fourth candidate speech element that is different from the second candidate speech element from among the candidate speech elements; and
generate, through the speech element generator, the second candidate speech element based on the linguistic feature, the style feature, and the content feature.

16. The speech generation apparatus of claim 14, wherein the processor is further configured to:
generate, through the speech element generator, the second candidate speech element based on the linguistic feature and the prosodic feature,
wherein the speech element generator comprises a generative adversarial network (GAN).

17. The speech generation apparatus of claim 14, wherein the processor is further configured to:
generate, through the speech element generator, candidate speech elements and store the generated candidate speech elements in the memory, in response to a cost of a candidate speech element in a first candidate speech sequence being greater than a threshold value.

18. The speech generation apparatus of claim 14, wherein the processor is further configured to:
generate, through the speech element generator, the second candidate speech element for each phonetic transcription unit corresponding to the input text.

19. The speech generation apparatus of claim 14, wherein the processor is further configured to:
generate the second candidate speech element through the speech element generator, in response to a cost of the first candidate speech element being greater than a threshold.

20. The speech generation apparatus of claim 14, wherein the memory is further configured to store speech elements corresponding to linguistic features and prosodic features, and the first candidate speech element is selected from the speech elements.

* * * * *